Aug. 25, 1964 P. A. SIDELL ETAL 3,146,363
ELECTRIC MOTOR AND METHOD OF MAKING SAME
Filed Dec. 21, 1960 2 Sheets-Sheet 1
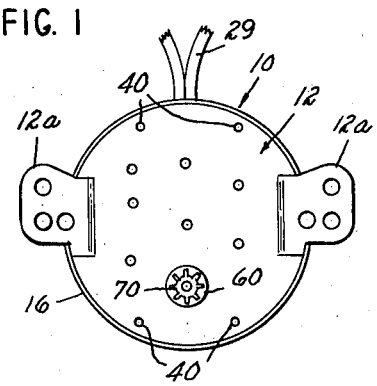
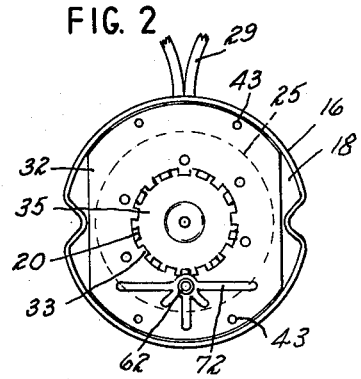
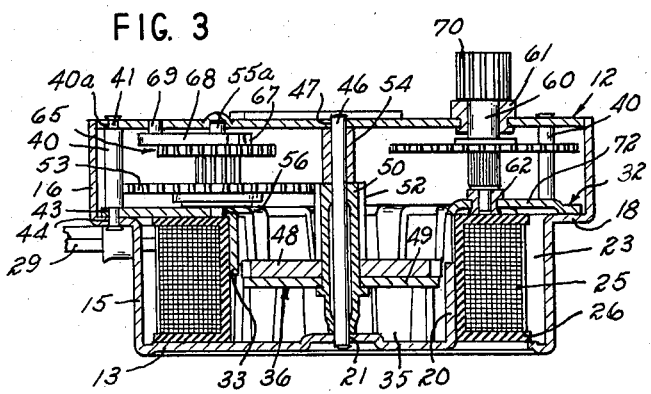
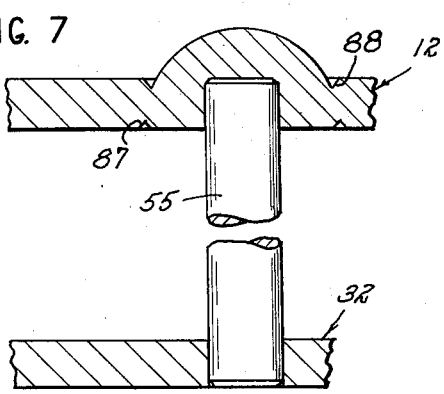
INVENTORS
PHILIP A. SIDELL
WILLIAM C. SCHAFFRICK
BY
Lindsey, Prutzman & Hayes
ATTORNEYS Aug. 25, 1964 P. A. SIDELL ETAL 3,146,363
ELECTRIC MOTOR AND METHOD OF MAKING SAME
Filed Dec. 21, 1960 2 Sheets-Sheet 2
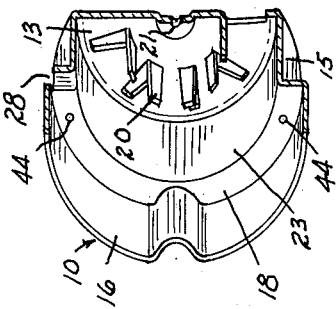
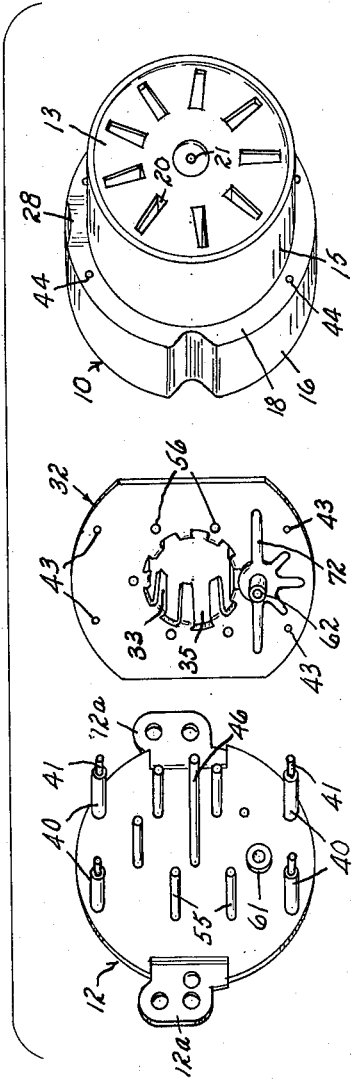
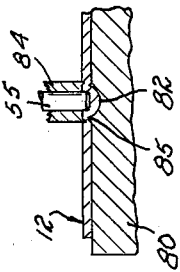
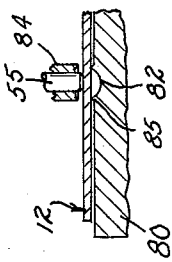
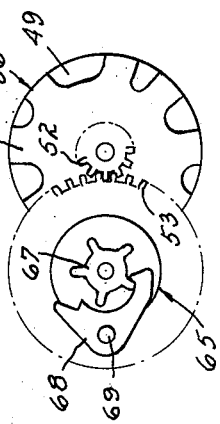
INVENTORS
PHILIP A. SIDELL
WILLIAM C. SCHAFFRICK
BY
Lindsey, Prutzman & Hayes
ATTORNEYS

3,146,363
ELECTRIC MOTOR AND METHOD OF MAKING SAME
Philip A. Sidell, West Hartford, and William C. Schaffrick, Plainville, Conn., assignors to The Ingraham Company, Bristol, Conn., a corporation of Connecticut
Filed Dec. 21, 1960, Ser. No. 77,327
12 Claims. (Cl. 310—83)

This invention relates to electric motors and is more particularly directed to the provision of an improved electric motor suitable for operating clock mechanisms and other timing devices, although the invention is applicable to other types of motors as well. This improved motor is adapted for manufacture at extremely low cost by novel methods which also form part of this invention.

It is the general object of this invention to provide an improved motor and gear case assembly that is very susceptible to mass production at extremely low cost; it is a further object of this invention to provide such a motor having an integral gear case assembly wherein the motor and gear case assembly utilize a maximum number of standard parts regardless of the desired output shaft speed.

It is an additional object of this invention to provide an improved motor and gear case assembly that is constructed to facilitate economical and accurate assembly of the component parts so as to provide an assembly having high durability and low operating noise.

It is a still further object of this invention to provide an extremely compact and low cost motor and gear case unit having a minimum number of openings for the introduction of foreign matter into the working parts.

An additional object of this invention is the provision of an improved motor and gear case assembly susceptible to quantity production with each motor exhibiting a uniformity of performance characteristics heretofore unobtainable at such a low cost.

In furtherance of the aforementioned objects, this invention includes new methods of manufacture and assembly of the motor and gear case parts which insures accurate alignment of the motor rotor and stator and an improved gear train assembly through use of a maximum number of low cost standard parts regardless of the desired output shaft speed.

Other objects will be in part obvious and in part pointed out more in detail hereinafter.

The invention accordingly consists in the features of construction, combination of elements an arrangement of parts which will be exemplified in the construction hereafter set forth and the scope of the application which will be indicated in the appended claims.

In the drawings:

FIG. 1 is a front plan view of a preferred embodiment of the completely assembled motor and gear case assembly of this invention;

FIG. 2 is a front plan view of the motor assembly of FIG. 1 with the cover plate and gear train removed;

FIG. 3 is an enlarged cross section view of the motor of FIG. 1 taken generally along the rotor axis and with a portion of the gear train removed;

FIG. 4 is an exploded perspective view showing the cover plate, field plate and housing of the motor of FIG. 1;

FIG. 5 is a partial perspective view of the housing of FIG. 4;

FIG. 6 is an enlarged plan view of the rotor direction of rotation control structure;

FIG. 7 is an enlarged cross section view showing the details of mounting the gear train arbors;

FIG. 8 is a schematic showing of the apparatus for securing the gear train arbors to the cover plate; and FIG. 9 is a schematic showing of the apparatus of FIG. 8 with the gear train arbor fastened to the cover plate.

For illustrative purposes, the motor of this invention is shown and described in the form of a single phase, alternating current motor having a permannent magnet rotor, such type of motor being particularly suitable for operating clock mechanisms and other timing devices. However, it is to be noted that this invention is applicable to other types of motor and gear case constructions.

Referring now to the illustrated preferred embodiment and particularly to FIGS. 1–5, it is seen that the motor and gear case assembly is contained within a generally cup-shaped housing 10 and a cover plate 12 that is provided with mounting ears 12a. Housing 10 is preferably drawn from a single piece of sheet metal stock to provide a rear wall 13, a first generally cylindrical side wall portion 15 of a first diameter and a second generally cylindrical side wall portion 16 of a larger diameter, the first portion joined therewith by an annular shoulder 18. Rear wall 13 supports a plurality of circularly arranged pole portions 20 arranged concentric with rotor arbor aperture 21. In the preferred embodiment, poles 20 are stamped out of and bent inwardly from rear wall 13 as hereinafter described in greater detail to define an annular chamber 23 with wall portion 15 into which field coil 25 on bobbin 26 is positioned. A suitable aperture 28 is provided in housing 10 for the field winding energizing connections 29. The motor stator construction is completed by seating field plate 32 on rim 18 so that poles 33 extend into chamber 23 and into the circumferential spaces between each adjacent pair of poles 20. For this purpose, poles 20 and 33 are equal in number but alternately arranged from base circles of equal diameter so as to extend coaxially. In the illustrated preferred embodiment, the poles 33 are integral with field plate 32 and bent outwardly therefrom to define a central aperture 35 dimensioned to receive rotor 36.

In order to properly position field plate 32 radially of housing 10 on shoulder 18 and to close the open end of housing 10, cover 12 is dimensioned to fit within the end of housing portion 16 and has mounted thereon a plurality of pillars 40 secured in apertures 40a adjacent the outer periphery thereof. Pillars 40 have ends 41 of reduced cross section which extend through apertures 43 in field plate 32 and apertures 44 in shoulder 18 of housing 10.

As hereinafter explained, the location of pillars 40 on cover plate 12, holes 43 in field plate 32 and holes 44 in shoulder 18 are predetermined so as to insure coaxial alignment of poles 20 and 33 with rotor arbor aperture 21. The rotor arbor 46 is secured at one end in aperture 47 of cover plate 12 in any desired manner in a position lying along the axis of the poles so as to fit within aperture 21 in housing rear wall 13.

Rotor 36 is comprised of a permanently magnetized disc 48 and an inertia disc 49 secured on bearing sleeve 50 in any desired manner so as to be concentric with rotor arbor 46. Bearing sleeve 50 can be conveniently formed from pinion stock so as to provide a rotor gear 52 that meshes with first pinion 53 of the output gear train. If desired and as shown in FIG. 3, bearing sleeve 50 can be shortened and a spacer sleeve 54 can be placed on rotor arbor 46 to properly position the rotor assembly axially of the field or stator assembly. Each pinion of the gear train is supported for rotation on a gear train arbor 55 that has one end thereof secured to cover plate 12 as hereinafter described and dimensioned to extend outwardly therefrom into an aligned aperture 56 formed in field plate 32. The various pinions, all of which are not shown in the drawings, couple rotation from rotor gear 52 to output shaft 60 which is journalled for rotation in bearing 61 secured to cover plate 12, and bearing 62 secured to field plate 32.

In order to insure rotation of rotor 36 in the desired direction, a no-back gear assembly generally designated 65 in FIG. 3 is positioned on the gear train arbor 55a that supports first pinion 53. As most clearly seen in FIGS. 3 and 6, assembly 65 includes a toothed element 67 journalled on arbor 55a for rotation with gear 53. The non-backing pawl 68 is pivotally mounted by pin 69 on cover plate 12 and arranged to permit rotation in one direction and to preclude it in the other. The toothed element 67 as well as first pinion 53 are fabricated from a resilient material such as nylon so that, should the rotor attempt to rotate in the incorrect direction, a small amount of force will be stored therein to urge or "kick" the rotor in the proper direction with the next change in field polarity.

Because output shaft 60 is supported against axial movement only by cover plate 12 and field plate 32, some difficulty may be experienced in attempting to change the external output pinion 70. Accordingly, a plurality of raised ribs or deformations 72 are provided in field plate 32 and extend from bearing 62 to a point over rim 18, thereby to greatly strengthen the field plate in the area of the bearing 62 and to facilitate changing of the output pinion.

Assembly of the aforedescribed motor and gear case structure is an exceedingly simple and economical manufacturing operation involving a minimum number of subassemblies. The desired output gear trains assembly is slipped over the gear train arbors 55 to properly mesh with the output gear mounted on shaft 60 already positioned within bearing 61. Field plate 32 is then positioned on the reduced end 41 of pillars 40 so that arbors 55 extend into the aligned apertures 56 in the field plate and shaft 60 extends into bearing 62 in the field plate. The output gear train and shaft are now properly positioned. Bushing 54 and rotor assembly 36 are slipped onto rotor arbor 46 through the aperture 35 in field plate 32. Field coil 25 is placed within recess 23 with the connecting leads extending out from aperture 28. The housing is then slipped onto the reduced end 41 of pillars 40 so that rotor arbor 46 extends into aperture 21. Reduced ends 41 of the pillars 40 are then staked or otherwise deformed to rigidly fasten the aforementioned assemblies into a compact economical motor and gear case assembly.

Operation of the motor is in accordance with conventional single-phase motor principles involving the use of a permanently magnetized rotor and it is believed not necessary to describe that operation.

In furtherance of the manufacture of a compact and economical motor and gear case assembly, manufacturing and assembling techniques have been devised to facilitate assembly of the various component parts so as to insure their precision alignment and quiet operation when made under mass production techniques. The alignment and mounting holes 44 in rim 18 of housing 10, the poles 20 on rear wall 13 and the rotor arbor hole 21 in rear wall 13 are simultaneously formed in, for example, a single die punching operation so as to insure precision positioning of the various holes relative to the field poles. If desired, the same punching operation can be utilized to bend and accurately position the poles 20 to extend in substantially parallel relationship about the circumference of a circle having the aperture 21 as its center. Additionally, the alignment and mounting holes 43 and the poles 33 of field plate 32 are also simultaneously formed in, for example, a single die punching operation to positively insure the precision positioning of the aligning holes 43 relative to the poles 33 and, if desired, the poles can be bent to the parallel position in the same operation. Finally, the alignment and mounting holes 40a, as well as the aperture 47 for rotor arbor 46 in cover plate 12 are also simultaneously formed in a die punching operation thereby to insure the precision positioning of arbor 26 relative to the mounting holes. In forming each of the afore-mentioned parts, it is clear that by using a single die punching operation to form the positioning and mounting holes as well as the field poles for each element not only insures that the field poles on the field plate will be coaxial with the field poles on the cup housing, but also insures that the rotor arbor will lie along the axis of the field poles so as to properly establish the desired air gap between the rotor and the field poles. That is, the mounting and aligning holes act as the reference points for locating the other holes as well as the field poles and the simultaneous formation operations provides hitherto unobtainable positioning accuracy. Additionally, the provision of such a mounting and aligning arrangement can be utilized for every motor made in accordance with this invention without regard to the type of gear train that is utilized thereby permitting substantial standardization of the manufactured parts to be used with a full-speed range of motors.

In order to supply the motor and gear case assembly of this invention in a wide variety of output shaft speeds while utilizing the same basic structural components, the location of the gear train arbors 55 is changed to accommodate the necessary change in pinion sizes without utilizing a cover plate having a large series of gear train arbor mounting holes, some of which are used and some of which are open to admit damaging foreign matter such as grit, etc. to the gearing and the motor. In accordance with one aspect of this invention, the gear train arbors are secured in the desired place on the cover plate without utilizing preformed mounting apertures. This mounting is accomplished through the use of a nailing operation which is best understood by reference to FIGS. 8 and 9 of the drawings. As seen in FIG. 8, a cover plate 12 is positioned over a die 80, which die is provided with one (or more) shallow depression 82 arranged and oriented in the desired position into which a gear train arbor is to be secured. Each gear train arbor 55 is mounted within a mandrel 84 so that a relatively small portion of its overall length protrudes therefrom. Upon exerting the necessary force between mandrel 84 and die 80, the arbor 55 is driven into the sheet metal of cover plate 12. The metal displaced by the end of the arbor is driven into the depression 82 and the arbor is held securely in position as see nin FIG. 9, a schematic representation of the cover plate, arbor, mandrel and die at the completion of a nailing operation. In order to further insure the proper gripping of the arbor end by sheet metal, an annular projection of generally V-shaped cross section is provided at the end of each mandrel 84 so as to coin the metal inwardly to tightly grip the arbor end at the completion of the nailing operation. Such a projection leaves a characteristic annular groove 87 as best seen in the enlarged representation of FIG. 7. If desired, and as shown in FIGS. 7, 8 and 9, an additional V-shaped annular projection 85 can be provided on die 80 to further assist in forcing the metal of plate 12 to grip the arbor end. Annular groove 88 is thereby formed in plate 12. This nailing operation can be completed by utilizing a single carrier for all the mandrels 84 so that all the shafts are nailed into position in a single operation. This, of course, requires that the die member 80 be provided with a depression 82 at each desired position. Additionally, it is necessary to punch or otherwise form apertures 56 in field plate 32 in alignment with each desired arbor position. This operation can also be completed in a single die stamping operation.

From the foregoing description of this nailing operation, it is apparent that a single cover plate and field plate can be provided for all motor sizes so that it is merely necessary to nail the gear train arbors into the desired position on the cover plate and punch mating apertures in the field plate so as to accommodate virtually any arrangement of arbors necessary to obtain the desired shaft output speed. Such an arrangement provides an essentially closed cover plate to preclude the introduction of unwanted and possibly injurious foreign matter into the interior of the housing.

From the foregoing description of the structure and method of assembly and manufacture of my improved unitary motor and gear case, it is apparent that this invention provides a very compact and economical structure ideally suited to mass production techniques while providing a high degree of accuracy, long life and quiet operation heretofore unobtainable with a motor of this type.

As will be apparent to persons skilled in the art, various modifications and adaptations of the structure above described will become readily apparent without departure from the spirit and scope of the invention, the scope of which is defined in the appended claims.

We claim:

1. A unitary motor and gear case assembly comprising a housing having rear and side walls, a plurality of circularly arranged poles integral with said rear wall and extending into said housings, a field winding disposed about said poles, a field plate, means on said housing supporting said field plate adjacent said field winding and intermediate the ends of said housing side wall, said field plate having a plurality of field poles integral therewith, mating apertures in said housing and said field plate positioned to coaxially align the field poles thereon when the mating apertures are aligned, a cover plate, mounting means secured to said cover plate and extending through the mating apertures in said field plate and said housing, said mounting means spacing said cover plate from said field plate and adjacent the open end of said housing to close said housing, a rotor arbor secured to said cover plate and positioned thereon to lie along the axis of said field poles when said mounting means extends through the aligned apertures in said housing and said field plate, a rotor on said arbor, an output shaft journaled between said field plate and said cover plate, and a gear train disposed within the space between said housing, said field plate and said cover plate and operatively connecting said rotor and said output shaft.

2. A unitary motor and gear case assembly comprising a housing having rear and side walls, a plurality of circularly arranged poles integral with said rear wall and extending into said housing, a field winding disposed about said poles, a field plate, means on said housing supporting said field plate adjacent said field winding and intermediate the ends of said housing side wall, said field plate having a plurality of field poles integral therewith, mating apertures in said housing and said field plate positioned to coaxially align the field poles thereon when the mating apertures are aligned, a cover plate, mounting means secured to said cover plate and extending through the mating apertures in said field plate and said housing, said mounting means spacing said cover plate from said field plate and adjacent the open end of said housing to close said housing, a rotor arbor secured to said cover plate and positioned thereon to lie along the axis of said field poles when said mounting means extends through the aligned apertures in said housing and said field plate, an aperture formed in the rear wall of said housing to restrain lateral movement of said rotor arbor, said last named aperture being positioned coaxially of the poles in said housing, a rotor journaled on said arbor, an output shaft journaled between said field plate and said cover plate, a plurality of gear train arbors mounted on said cover plate and extending into aligned apertures in said field plate, and a gear train mounted on said gear train arbors and operatively interconnecting said rotor and said output shaft.

3. The unitary motor and gear case assembly as set forth in claim 1 wherein said means on said housing for supporting said field plate comprises annular shoulder integrally formed in the side wall of said housing and wherein the apertures in said housing for aligning said housing relative to said field plate are formed in said annular shoulder.

4. The unitary motor and gear case assembly as set forth in claim 3 wherein said mounting means comprises pillars secured to said cover plate and having free ends of reduced cross section passing through the aligned apertures in said field plate and said annular rim to secure said field plate in intimate engagement with said rim and to space said cover plate from said field plate.

5. A unitary motor and gear case assembly comprising a generally cup-shaped sheet metal housing having a rear wall and a side wall, said side wall having an annular shoulder formed intermediate its ends, said rear wall having circularly arranged poles integral therewith and extending inwardly therefrom, a field winding disposed about said poles and seated in said housing between said shoulder and said rear wall, a sheet metal field plate seated on said shoulder and within said side wall, said field plate having field poles integral therewith arranged alternately with the poles on said housing, said field plate being apertured centrally of said poles, a plurality of apertures formed in said shoulder and in said field plate, said apertures on said field plate being positioned to coaxially align the poles thereon with the poles on said housing when aligned with the apertures on said housing, a cover plate, a plurality of pillars secured to said cover plate and arranged to pass through the aligned apertures in said field plate and said housing, a rotor arbor secured to said cover plate and positioned thereon to lie along the axis of said poles when said pillars are positioned in the aligned field plate in housing apertures, a rotor journaled on said rotor arbor and within said aligned field poles, means securing said pillars to said housing to space said cover plate from said field plate and adjacent the end of said housing side wall to define a gear case therebetween, an output shaft journaled between said cover plate and said field plate and a gear train disposed within said gear case and operatively interconnecting said rotor and said output shaft for simultaneous rotation.

6. The unitary motor and gear case assembly as set forth in claim 3 wherein said output shaft is located adjacent to said annular shoulder and said field plate is provided with deformed ribs extending from said output shaft to said shoulder to strengthen the axial support of said shaft.

7. The unitary motor and gear case assembly as set forth in claim 5 wherein the rear wall of said housing is centrally apertured to receive said rotor arbor and to restrain lateral movement of said rotor arbor, said aperture being positioned on the axis of said poles.

8. The unitary motor and gear case assembly as set forth in claim 5 wherein said cover plate is provided with a plurality of gear train arbors extending into aligned apertures in said field plate and said gear train is mounted on said arbors.

9. The unitary motor and gear case assembly as set forth in claim 5 wherein the apertures in said housing are located in said annular shoulder and said pillars have ends of reduced cross section passing through the aligned apertures in said field plate and said shoulder.

10. An electric motor and gear case assembly comprising a housing having an open front and a set of field poles integral with the rear wall thereof, a field winding disposed about said field poles, a field plate having a set of field poles integral therewith, means integral with said housing and supporting said field plate within said housing and spaced from the open front thereof, a plurality of apertures in said housing and in said field plate, said apertures being alignable to coaxially position said sets of field poles, a cover plate, a rotor arbor secured to said cover plate, connecting means carried by said cover plate and passing through the apertures in said field plate and said housing to align said sets of field poles and position said rotor arbor along the common axis of said sets of field poles, a rotor on said arbor, an output shaft journaled in said cover plate and a gear train supported between said field plate and said cover plate and operatively connecting said rotor and said output shaft for simultaneous rotation.

11. The electric motor and gear case assembly as set forth in claim 10 wherein the rear wall of said housing is centrally apertured to receive said rotor arbor and to restrain lateral movement of said rotor arbor, said aperture being positioned on the axis of the set of field poles on said housing.

12. The electric motor and gear case assembly as set forth in claim 10 wherein said cover plate is provided with a plurality of gear train arbors extending parallel to said rotor arbor into aligned apertures in said field plate and said gear train is mounted on said gear train arbors.

References Cited in the file of this patent

UNITED STATES PATENTS

| | | |
|---|---|---|
| 2,465,042 | Schlenker et al. | Mar. 22, 1949 |
| 2,810,844 | Morrill | Oct. 22, 1957 |
| 2,838,701 | Kuhagen | June 10, 1958 |
| 2,908,965 | Platt | Oct. 20, 1959 |
| 2,967,346 | McMaster et al. | Jan. 10, 1961 |

FOREIGN PATENTS

| | | |
|---|---|---|
| 716,552 | Great Britain | Oct. 6, 1954 |